May 15, 1956 C. L. CORNWELL 2,745,633
CABLE SPEED INDICATOR
Filed June 22, 1953 2 Sheets-Sheet 1
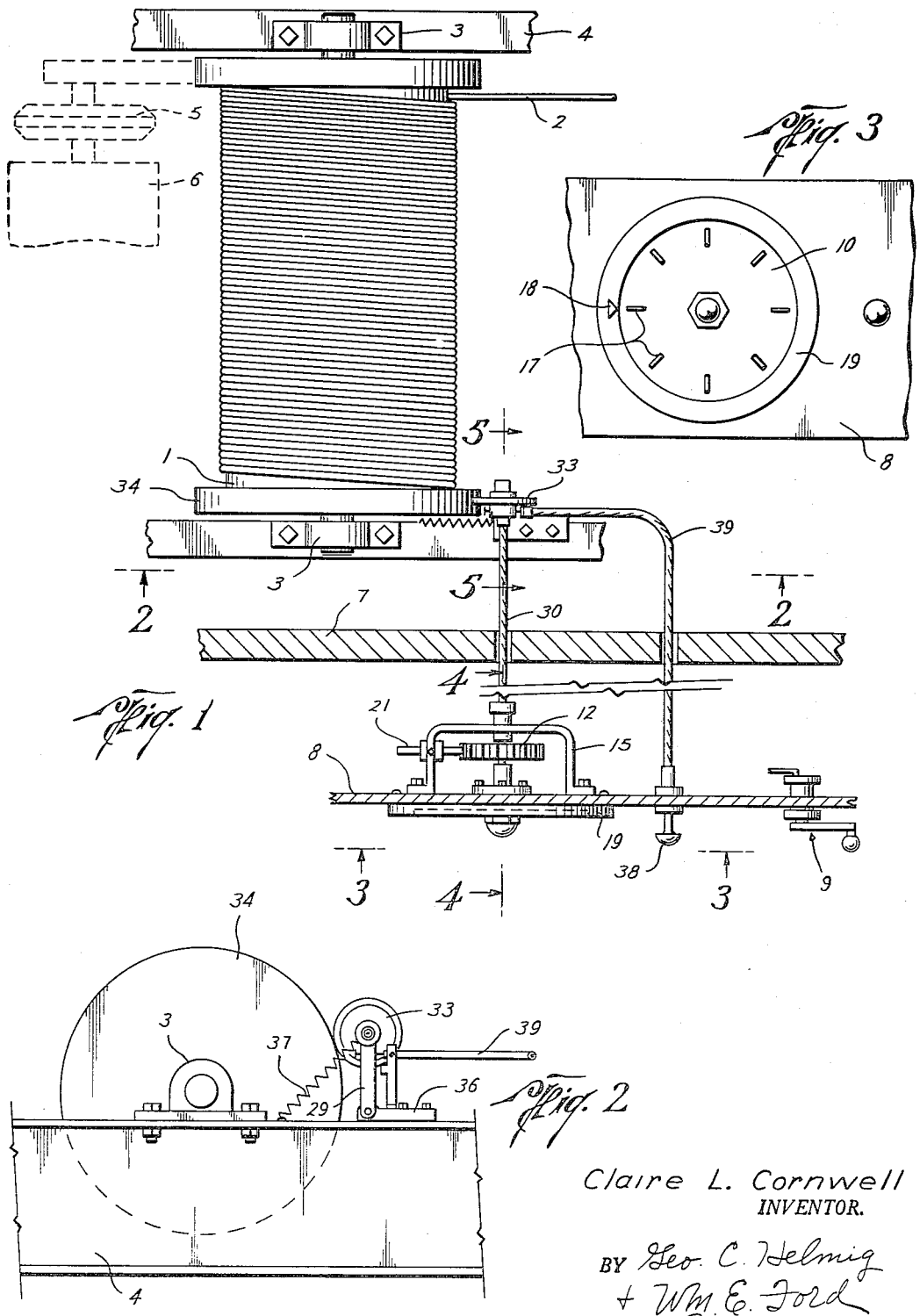
Claire L. Cornwell
INVENTOR.
BY Geo. C. Helmig
+ Wm. E. Ford
ATTORNEYS May 15, 1956
C. L. CORNWELL
2,745,633
CABLE SPEED INDICATOR
Filed June 22, 1953
2 Sheets-Sheet 2
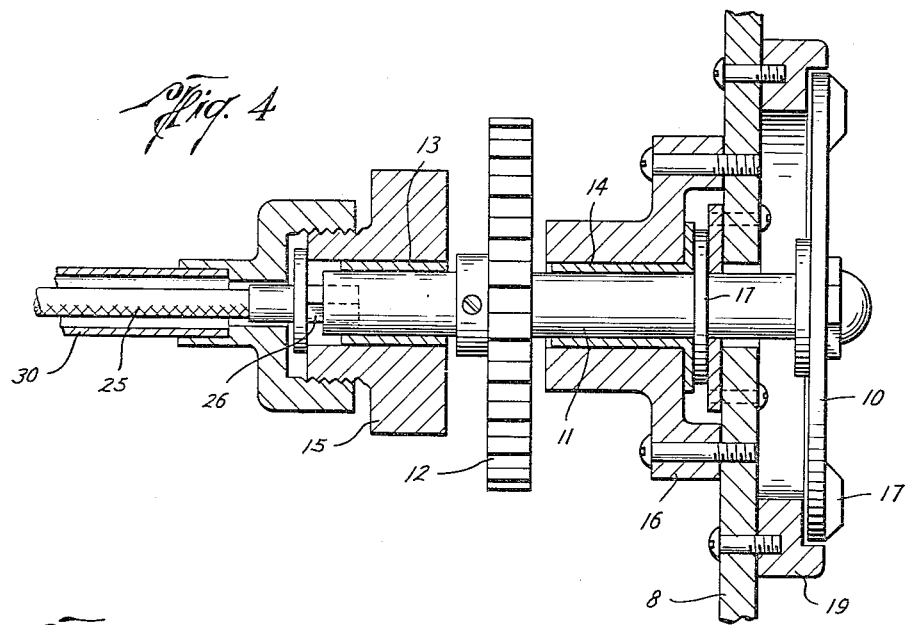
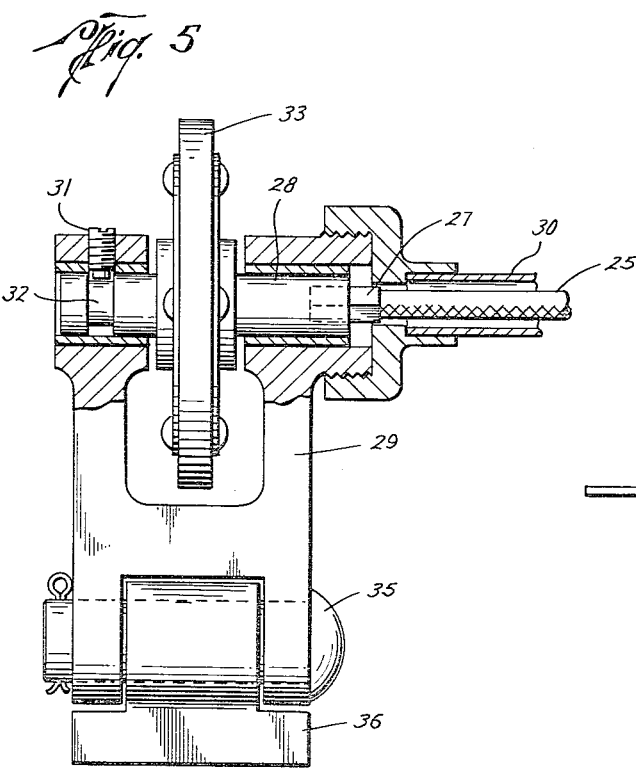
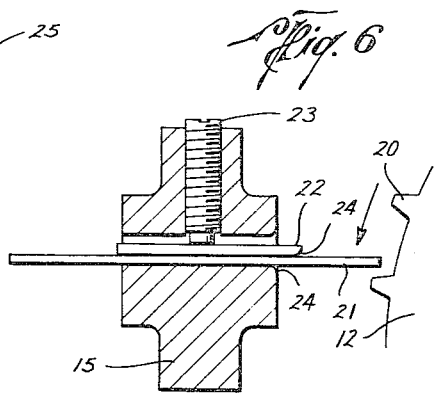
Claire L. Cornwell
INVENTOR.
BY Geo. C. Helmig
+ Wm. E. Ford
ATTORNEYS

United States Patent Office 2,745,633
Patented May 15, 1956

2,745,633

CABLE SPEED INDICATOR

Claire L. Cornwell, Texas City, Tex.

Application June 22, 1953, Serial No. 363,234

6 Claims. (Cl. 254—150)

This invention relates to an improved indicator of cable winding drum rotation and more particularly to a drum responsive sensitizing arrangement for alerting the operator of heavy duty equipment, such as large lift cranes, drag lines and the like.

For safe operation it is important that the operator devote keen attention without diversion to the proper manipulation of a number of controls either simultaneously or in related sequence and he needs to be aware of the responses of the mechanisms as the controls are manipulated. The size and massiveness of such equipment often results in the location of the operator station in a cab walled away and at a distance from the power unit and cable wind-up drums so that the operator is unable to watch, hear, feel, or be otherwise sensitive to the mechanism under his control. Often the working end of the cable is out of sight to the operator who depends on hand and other signals transmitted by other workmen but, unless the operator can apprize himself of the rate of cable travel, especially at the start, and the response of clutch and brake apply and release operations, there is danger from paying cable in or out erratically and at a rate too slow or too fast. The situation is aggravated when the engine drive is transmitted through an automatic change speed ratio apparatus or a slip coupling, such as a fluid fly wheel or a hydraulic torque convertor transmitting drive at infinitely variable ratio with a widely variable lag of the fluid driven rotor behind the drive impeller, since engine speed in relation to drum rotation speed varies widely with load conditions, and manipulation of engine speed controls does not reflect the rate of drum rotation. Many equipments of recent origin incorporate slip or lag type drive couplings, but as indicated they present the disadvantages of further complicating the safety factor with respect to operator sensitiveness to the rate of drum rotation.

It is an object of the present invention to provide an improved indicator mechanism to make available at the operator cab or station an accurate representation of cable travel.

Another object is to provide mechanism which can be placed into and out of operation at will according to work requirements and which affords to the operator a selection of touch, sound and visional signals alone or in any combination.

A further object of the invention is to provide equipment which can be readily assembled with a few low-cost simple and for the most part already available parts for easy and quick application to existing apparatus with no substantial modification thereof and which will require a minimum of maintenance and will have a long life of efficient and reliable operation.

Additional objects and advantages will become apparent during the course of the following specification, having reference to a preferred embodiment illustrated in the accompanying drawing, wherein: Fig. 1 is a top plan view, with parts in section, of a winding drum and an indicator installation; Fig. 2 is a side elevation looking in the direction of the arrows on line 2—2 of Fig. 1 and showing a clutchable drive for transmitting drum rotation; Fig. 3 is an elevation of the front face of the indicator mechanism mounted on an instrument or control panel in the operator cab and is viewed as on line 3—3 of Fig. 1; Figs. 4 and 5 are longitudinal sectional views on lines 4—4 and 5—5 respectively, of Fig. 1, and Fig. 6 is a detail fragmentary view of an audible signal structure.

Referring to the drawings, the drum 1 is shown with a winding of cable 2 and its supporting shaft is mounted at opposite ends in support bearings 3 carried by the frame 4 of the machine. The usual drive for the drum is represented diagrammatically by broken lines at the left of Fig. 1 as including a torque convertor 5 whose output side is geared to the drum 1 and whose input side is connected with an engine 6. It will be understood that conventional clutch and brake mechanism may be employed and the controls for these mechanisms are handled remotely from the operator's cab.

The operator cab is insulated from the operating mechanism as by means of a partition or wall 7 and contains an instrument and control panel 8 on which is shown, for example, a control lever 9 such as an engine speed or throttle handle lever. While the operator works the hand controls for causing desired drum actuation of the mechanism his sight is directed toward the working end of the cable or on a workman transmitting hand signals, but he may at the same time feel in his remote location, the speed of cable winding drum rotation and any lag between control lever setting and cable travel, by keeping his hand or finger against a rotor operating in the relation to drum rotation. For this purpose there is mounted on the panel 8 a rotor assembly which includes a disc 10 in front of the panel and on an end of a shaft 11 together with a wheel 12 secured on the shaft behind the panel. The rotor assembly has its shaft 11 supported in a pair of axially spaced bearing sleeves 13 and 14 carried in brackets 15 and 16. The bracket 15 is a U-shaped strap whose side legs terminate in feet to be bolted or otherwise secured on the back of the panel 8. The bracket 16 consists of a central hub and an annular flange to receive fastening screws which hold the bracket on the back of the panel. The end face of the bracket 16 is hollow and it houses an annular shoulder 17 on the shaft 11 for operation between thrust bearing rings, one being an annular flange on the bearing sleeve 14 and the other being a facing ring secured to the rear face of the panel 8.

On the front face of the disc 10 there are preferably carried, at least one, and conveniently a series of circumferentially spaced feeler formations which may be either or both ridges or depressions and are illustrated as bumps or projections 17 near the rim of the disc 10. By touching the rotatable disc 10 the operator receives the sense of drum rotation as his finger feels the turning irregularities in the disc surface. As shown in Fig. 3 a marker or pointer 18 may be carried on a fixed ring 19 for visional contrast of relative speed. This ring 19 has its front face counterbored or rabbetted to protectively house the rim of the spinner disc 10.

The wheel 12 carries at its periphery one or more projections or teeth 20 and extending into the path of the projections is the free end of a flexible reed or spring blade 21 whose opposite end is fixedly mounted in an adjacent side leg of the rear bracket 15.

Thus as seen in Fig. 6 one face of the reed 21 rests or bears against a side surface of a slot through the bracket 15 and its opposite face is engaged by a clamp shoe or plate 22 which is adjustably fixed or anchored by a set screw 23, threaded in the bracket. To prevent injury to the vibratory reed 21 the end corners of the opposite clamping surfaces are curved or flared outwardly as at 24—24 as seen in Fig. 6. The shoe 22 extends further outwardly toward the spinner wheel 12 than does the bearing for the opposite face of the reed, and on movement of the wheel in one direction the effective length of the vibrating reed is greater than it is during rotation in the opposite direction. Hence the clicking sound or pitch of the reed will be different to indicate the respective directions of rotation. In either event, the number of or spacing between clicks will give an audible signal to indicate the rate of rotation.

If desired the spinners 10 and 12 may be combined into one unit or in other words, the disc 10 may co-operate with a vibratory reed and the toothed projections for striking the reed may also constitute the touch feelers for the operator's hand.

A flexible motion transmitting shaft of a conventional type and of proper length is proposed for connecting the rotor shaft 11 with the drum or the drum actuating mechanism. The drawing shows a flexible shaft 25 having a squared terminal 26 fitted to a squared opening in the rear end of the rotor shaft 11 and a similar squared terminal 27 at its opposite end for keyed engagement with a driving shaft 28 mounted in suitable bearings in the free end of a swinging forked lever 29. The usual protective sheathing 30 encloses the drive cable 25. A locating stud 31 carried by one fork of the lever 29 has its inner end projecting into an annular groove 32 in the shaft 28. Carried by the shaft between the prongs of the lever is a frictional drive wheel 33 for rim engagement with one of the side flanges 34 of the cable drum. The supporting lever is pivoted at its lower end on a pin 35 carried by a fixed bracket 36. A coiled tension spring 37 is anchored at one end to the frame and is secured at the other end to the lever 29 and urges the friction wheel 33 into close driving contact in the drum flange 34. By this means, drum rotation is transmitted to the remotely positioned indicator rotor.

For certain types of operation, the operator may not care to use the indicator mechanism and accordingly a control knob 38 is mounted on the instrument panel 8 and is associated with a Bowden wire 39 whose rear end is connected with the lever 29 so that when the control knob is pulled outwardly the Bowden wire connection will retract the lever 29 and move the friction drive wheel 33 out of contact with the drum flange.

From the above description it will be apparent that there is provided a low-cost indicator which can be economically applied to cable drums for removing guess work and giving to the operator better control over his equipment whereby safety is increased and more reliable work can be done quickly with less strain on the operator.

While but one embodiment of this invention is illustrated, it will be understood that various modifications can be made as come within the appended claims.

What is claimed is:

1. An accessory equipment for application to a cable winding drum apparatus, including a drum engageable driving wheel, a mounting adjustably supporting the wheel for movement into or out of driving engagement with the drum, a wheel drive transmitting flexible shaft leading to a distant operator station, an operator station control panel, a driven rotor mounted on the control panel and drive connected to said shaft, finger feel knobs on said rotor for operator finger contact and feel of the rate of rotation, a visual marker fixed relative to the rotor for co-operation with said knobs, a rotor carried series of peripherally spaced projections, a sounding reed having its free end entering between said projections to be struck thereby, a support for the opposite end of the reed having a fixed bearing for one reed face and an adjustable bearing for the other reed face for varying the reed vibration rate in one direction of wheel rotation relative to reed vibration rate in the opposite direction of wheel rotation, a panel control knob connected with the adjustable wheel mounting to set the wheel in or out of drum drive engagement and spring means acting on the mounting to urge the wheel toward drive engagement.

2. In combination, a drum, an operator drum control station remote from the drum, a touch feeler rotor mounted at the station, a friction drive wheel engageable with the drum, a flexible drive connection between the drive wheel and said touch feeler, a spring pressed arm carrying the wheel and urging the same into friction drive with the drum and an operator control connection operable to retract said arm.

3. The structure recited in claim 2 wherein a sounding reed is mounted adjacent the rotor and the rotor carries a reed striker formation for vibrating the reed in relation to the rate of rotation.

4. Power driven equipment including a drum, an engine driven fluid drive therefor, an operator control station spaced from the drum a distance beyond operator reach, a rotor mounted at the station and connected for rotation with the drum, a sounding reed engaging projection carried by the rotor, a reed whose free end is in the path of said projection, and means for adjustably varying the vibratory rate and length of the free end of said reed comprising a fixed bearing for one face of the opposite end of the reed, an adjustable clamp shoe bearing on the other reed face and co-operating with the fixed bearing to clamp the reed therebetween and adjustable means to hold the adjustable clamp shoe at any one of several selected positions in the direction of reed length.

5. In a machine of the character described, an operator station, a cable winding drum remote therefrom, a power drive unit for the drum including a drive transmitting infinitely variable ratio coupling whose driven member variably lags behind its driving member, a drive unit control at the operator station, a touch feeler in the operator station and a clutchable drive through which drum response to applied power is transmitted to said touch feeler to enable proper manipulation of said drive unit control.

6. Accessory apparatus for use with a power fluid driven rotary drum out of convenient reach from an operator control station for enabling operator determination of the extent of drum rotation, including a spinner rotor carrying a touch feeler radially spaced from the rotor axis for travel in a fixedly defined circular path within touch of an operator, a rotor bearing support mounting said rotor on an axis remotely spaced from the axis of drum rotation and at the operator station, drum rotation drive transmitting means including a flexible shaft of a length to extend from the rotor to the remotely located drum and connected to rotate said rotor at a speed directly related to drum rotation and also including a rotary member driven with drum rotation, a spring pressed member clutching device to receive rotary drive and drive connected with said flexible shaft and manually operated means to control the member clutching device.

References Cited in the file of this patent

UNITED STATES PATENTS

| | | |
|---|---|---|
| 759,513 | Frahm | May 10, 1904 |
| 1,632,976 | Kourtzman | June 21, 1927 |
| 1,993,150 | Drake | Mar. 5, 1935 |
| 2,391,580 | Mackmann et al. | Dec. 25, 1945 |
| 2,717,993 | Newsom | Sept. 13, 1955 |